US006228916B1

(12) United States Patent
Sato et al.

(10) Patent No.: US 6,228,916 B1
(45) Date of Patent: May 8, 2001

(54) CONJUGATED DIENE POLYMER COMPOSITION AND RUBBER-REINFORCED STYRENE RESIN

(75) Inventors: Masao Sato, Yokohama; Tomohiro Iihara, Kawasaki; Masahiro Sasagawa, Yokohama, all of (JP)

(73) Assignee: Asahi Kasei Kogyo Kabushiki Kaisha, Osaka (JP)

( * ) Notice: Under 35 U.S.C. 154(b), the term of this patent shall be extended for 0 days.

(21) Appl. No.: 09/381,575

(22) PCT Filed: Mar. 30, 1998

(86) PCT No.: PCT/JP98/01437

§ 371 Date: Sep. 22, 1999

§ 102(e) Date: Sep. 22, 1999

(87) PCT Pub. No.: WO98/44034

PCT Pub. Date: Aug. 10, 1998

(30) Foreign Application Priority Data

Mar. 31, 1997 (JP) .................................................. 9-080089

(51) Int. Cl.[7] .............................. C08J 5/10; C08K 5/36; C08L 25/10
(52) U.S. Cl. ............................................ 524/331; 524/291
(58) Field of Search ....................... 524/331, 291

(56) References Cited

U.S. PATENT DOCUMENTS 4,880,470 * 11/1989 Hyche et al. ...................... 106/271

FOREIGN PATENT DOCUMENTS

| 31334 | 2/1991 | (JP) . |
| 246454 | 9/1992 | (JP) . |
| 252243 | 9/1992 | (JP) . |
| 292188 | 11/1995 | (JP) . |

* cited by examiner

Primary Examiner—James J. Seidleck
Assistant Examiner—U. K. Rajguru

(74) Attorney, Agent, or Firm—Birch, Stewart, Kolasch & Birch, LLP

(57) ABSTRACT

A conjugated diene polymer composition comprising:
  (a) 100 parts by weight of a non-coupling conjugated diene polymer consisting of at least one conjugated diene or a non-coupling random copolymer consisting of a conjugated diene and at least one monovinyl aromatic compound,
  (b) 0.03 to 0.2 parts by weight of a sulfur-containing phenol type antioxidant represented by the following general formula (I):

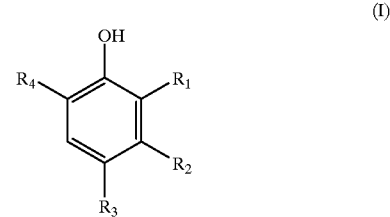

(I)

wherein $R_1$ and $R_3$ are $-CH_2-S-R_5$ in which each $R_5$ represents independently an alkyl group having 2 to 18 carbon atoms; $R_2$ represents hydrogen or a methyl group; and $R_4$ represents an alkyl group having 1 to 8 carbon atoms, and (c) 0.03 to 0.2 parts by weight of a phenol type antioxidant represented by the following general formula (II):

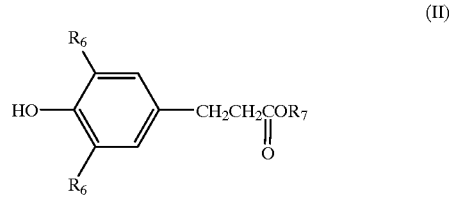

(II)

wherein $R_6$ represents a tert-butyl group and $R_7$ represents an alkyl group having 2 to 22 carbon atoms.

6 Claims, No Drawings

CONJUGATED DIENE POLYMER COMPOSITION AND RUBBER-REINFORCED STYRENE RESIN

This application is the national phase under 35 U.S.C. §371 of PCT International Application No. PCT/JP98/01437 which has an International filing date of Mar. 30, 1998, which designated the United States of America.

TECHNICAL FIELD

This invention relates to a conjugated diene polymer composition which is suitable as a rubber for the modification of a styrene resin and has an excellent stability and a good color tone and to a rubber-reinforced styrene resin in which the above polymer composition is used and which has an improved color tone and impact strength.

BACKGROUND ART

Conjugated diene polymers have heretofore been broadly used for the modification of resins and in various industrial articles. However, the conjugated diene polymers cause the generation of a gel and discoloration during a long term storage at a high temperature or under a thermal shear stability, so that particularly when it is used for the modification of a resin, the presence of a gel in the polymer and the discoloration of the polymer adversely affects final resin products. Therefore, there has been earnestly desired the appearance of a conjugated diene polymer composition which is excellent in heat stability at a high temperature and shear heat stability and very small in the generation of a gel and discoloration. For these problems, phenol type stabilizers, phosphorus type stabilizers and the like have heretofore been used as stabilizers for preventing gelation.

As a technique concerning a composition of a conjugated diene polymer having an excellent stability and a good color tone, there is a method in which a low molecular weight monophenol type antioxidant is combined with a high molecular weight monophenol type antioxidant and a specific organic carboxylic acid is added (JP-A-3-31,334). There is also a method in which a coupling rubber or a monoalkenyl aromatic compound-conjugated diene block copolymer is combined with a specific phenol type stabilizer or phosphorus type stabilizer (JP-A-4-252,243 and JP-A-4-246,454).

However, these techniques require the use of a large amount of an antioxidant and are not satisfactory in respect of resistance to discoloration. An object of this invention is to solve these problems and provide a rubber-like conjugated diene polymer composition which is suitable as a toughening agent for a styrene resin and excellent in both stability and color tone. In addition, in the prior art, it has been impossible to obtain a styrene resin having an excellent color tone and an excellent impact strength. Accordingly, another object of this invention is to provide a rubber-reinforced styrene resin having an excellent color tone and an excellent impact strength.

DISCLOSURE OF THE INVENTION

The present inventors have made an examination for solving the above-mentioned problems and have consequently found that a conjugated diene polymer composition which is excellent in heat stability, color tone and resistance to discoloration is obtained by using a non-coupling diene polymer in combination with a specific sulfur-containing phenol type antioxidant and a specific phenol type antioxidant each in a specific amount range, and further found that a styrene resin having excellent characteristics is obtained when said composition is used as a toughening agent for a styrene resin, whereby this invention has been made.

That is to say, this invention relates to a conjugated diene polymer composition which is excellent in heat stability, color tone and resistance to discoloration and which comprises:

(a) 100 parts by weight of a non-coupling conjugated diene polymer consisting of at least one conjugated diene or a non-coupling random copolymer consisting of a conjugated diene and at least one monovinyl aromatic compound, (b) 0.03 to 0.2 part by weight of a sulfur-containing phenol type antioxidant represented by the following general formula (I):

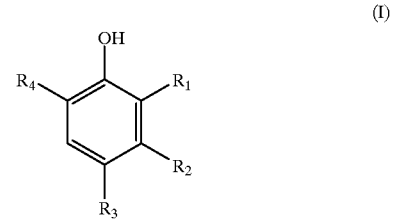

wherein $R_1$ and $R_3$ are —$CH_2$—S—$R_5$ in which each $R_5$ represents independently an alkyl group having 2 to 18 carbon atoms; $R_2$ represents hydrogen or a methyl group; and $R_4$ represents an alkyl group having 1 to 8 carbon atoms, and (c) 0.03 to 0.2 part by weight of a phenol type antioxidant represented by the following general formula (II):

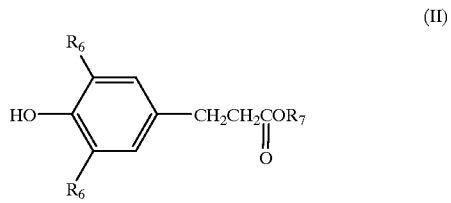

wherein $R_6$ represents a tert-butyl group; and $R_7$ represents an alkyl group having 2 to 22 carbon atoms.

BEST MODE FOR CARRYING OUT THE INVENTION

In this invention, the conjugated diene polymer used as the component (a) is a non-coupling conjugated diene polymer consisting of at least one conjugated diene or a non-coupling random copolymer consisting of a conjugated diene and at least one monovinyl aromatic compound and can be obtained by a known method. For example, the conjugated diene polymer is obtained by polymerizing a conjugated diene or copolymerizing a conjugated diene with a monovinyl aromatic hydrocarbon by an anionic polymerization method using an organolithium compound in an inert hydrocarbon solvent such as n-hexane, cyclohexane or the like using n-butyllithium, sec-butyllithium or the like as an initiator. Moreover, in the production of the conjugated diene polymer, it is possible to use a Ziegler catalyst consisting of an organic compound of nickel, cobalt or the like and an organometallic component of aluminum, magnesium or the like.

The conjugated diene used in this invention is a diolefin having a pair of conjugated double bonds and there are mentioned, for example, 1,3-butadiene, 2-methyl-1,3-butadiene (isoprene), 2,3-dimethyl-1,3-butadiene, 1,3-pentadiene, 1,3-hexadiene and the like. As particularly general ones, there are mentioned 1,3-butadiene and isoprene. These can be used alone or in admixture of two or more.

As the monovinyl aromatic compound used in this invention, there are mentioned styrene, o-methylstyrene, p-methylstyrene, 1,3-dimethylstyrene, α-methylstyrene and the like, and as particularly general ones, there are mentioned styrene, p-methylstyrene and α-methylstyrene. These can be used alone or in admixture of two or more.

The weight average molecular weight of the diene polymer used in this invention is generally 10,000 to 2,000,000, preferably 50,000 to 1,000,000, and it is essential that the polymer structure be a non-coupling conjugated diene polymer or a non-coupling random copolymer. Here, the non-coupling polymer means a polymer which has not been subjected to a process of coupling reaction in which a polyfunctional coupling agent, for example, a compound such as silicon tetrachloride, tin tetrachloride or divinylbenzene, is used. A polymer having a coupling structure is not desirable with respect to color tone. In addition, a polymer having a coupling structure and a copolymer having a block structure are not desirable because when they are used as a toughening agent for a styrene resin, only a resin inferior in color tone and impact strength is obtained.

The conjugated diene portion of the diene polymer used in this invention has a microstructure in which the vinyl bond content is preferably less than 33% though it is As not particularly limited. Here, the vinyl bond content means the proportion of the conjugated diene compounds incorporated in the bonding manner of a 1,2-bond and 3,4-bond into the diene polymer based on those incorporated in the bonding manner of 1,2-bond, 3,4-bond and 1,4-bond thereinto.

When the heat stability of the diene polymer composition itself is maintained high and simultaneously the diene polymer composition is used as a toughening agent for a styrene resin, the vinyl bond content is preferably not more than 30 mole % in order to maintain a high impact strength. Moreover, when it is used as a toughening agent for a styrene resin, the vinyl bond content is preferably not less than 10 mole % in order to maintain the impact strength high. Accordingly, the vinyl bond content is more preferably 10 to 30 mole %, and particularly preferably 10 to 25 mole %.

In the case of the random copolymer, the amount of the monovinyl aromatic compound bound is not more than 65% by weight, preferably not more than 50% by weight. The bonds of the monovinyl aromatic compound are incorporated basically at random into the conjugated diene and at least 50% by weight of the monovinyl aromatic compound is incorporated at random.

In this invention, in the sulfur-containing phenol type antioxidant represented by the above-mentioned general formula (I) used as the component (b), the substituents $R_1$ and $R_3$ are —$CH_2$—S—$R_5$ in which $R_5$ is an alkyl group having 2 to 18 carbon atoms, preferably an n-octyl group or an n-dodecyl group. The substituent $R_2$ represents hydrogen or a methyl group. The substituent $R_4$ represents an alkyl group having 1 to 8 carbon atoms, and as examples thereof, there are mentioned a methyl group, ethyl group, n-butyl group, sec-butyl group, tert-butyl group and the like, and preferably, a methyl group or tert-butyl group is mentioned. As specific examples of the compound represented by the general formula (I), there are mentioned 2,4-bis(n-octylthiomethyl)-6-methylphenol, 2,4-bis(n-dodecylthiomethyl)-6-methylphenol and the like. Most preferably, 2,4-bis(n-octylthiomethyl)-6-methylphenol is mentioned.

In this invention, in the phenol type antioxidant represented by the above-mentioned general formula (II) used as the component (c), preferable examples of the substituent $R_7$ are an octadecyl group and the like. As examples of the compound, there are mentioned, for example, n-octadecyl 3-(3',5'-di-tert-butyl-4'-hydroxyphenyl)-propionate and the like.

The composition of this invention is characterized in that per 100 parts by weight of the above-mentioned conjugated diene polymer or the above-mentioned random copolymer, 0.03 to 0.2 parts by weight of the specific sulfur-containing phenol type antioxidant represented by the above-mentioned general formula (I) and 0.03 to 0.2 parts by weight of the specific phenol type antioxidant represented by the above-mentioned general formula (II) are blended. In this invention, these antioxidants having the specific structures are used together and the heat stabilization effect can be achieved by the synergistic effect of them. When the antioxidants are each used alone, the heat stabilization effect is small. In addition, when each of them is used together with other hindered phenol type antioxidants than those represented by the above-mentioned general formula (I) and the above-mentioned general formula (II), no synergistic effect is recognized.

By combining the antioxidant of the above-mentioned general formula (I) with the antioxidant of the above-mentioned general formula (II) in limited amounts, there is obtained a composition which is good in color tone and excellent in color tone stability and heat stability. When each of the amounts of the antioxidant of the above-mentioned general formula (I) and the antioxidant of the above-mentioned general formula (II) blended is less than 0.03 part by weight, the heat stability and the color tone stability are bad, and even when each of the above amounts exceeds 0.2 part by weight, the effect on stabilization is not substantially increased any more and the color tone is deteriorated. Moreover, the blending thereof in amounts larger than the necessary amounts is economically disadvantageous. Each of the amounts of them blended is preferably 0.05 to 0.15 part by weight, more preferably 0.07 to 0.12 part by weight.

The polymer composition of this invention preferably contains water in addition to the above components (a), (b) and (c) with respect to heat stability. The amount of water is preferably 0.1 to 0.7 parts by weight, more preferably 0.2 to 0.6 parts by weight, per the polymer. When the water content is less than 0.1 parts by weight, the dynamic stability is low, and when it exceeds 0.7 parts by weight, opacification is caused and the use as a toughening agent for a styrene resin becomes impossible.

The conjugated diene polymer composition of this invention is used as a toughening agent for a styrene resin.

The rubber-reinforced styrene resin of this invention comprises the above-mentioned conjugated diene polymer composition moiety and a styrene resin moiety. This rubber-reinforced styrene resin may be a blend of the conjugated diene polymer composition with a styrene resin or the above two may be combined with each other by a chemical bond as in a graft product. The rubber-reinforced styrene resin of this invention is preferably obtained by radically polymerizing vinyl aromatic monomers in the presence of a conjugated diene polymer composition. As the method of obtaining the rubber-reinforced styrene resin, any known method can be used as far as attention is paid so that the effect of this invention is satisfactorily obtained; however, a bulk polymerization method, a solution polymerization method and a bulk-suspension polymerization method are advantageously utilized in industry.

The above vinyl aromatic monomers used for the radical polymerization are vinyl aromatic compounds such as styrene, p-methylstyrene, vinyltoluene, a-methylstyrene and the like or mixtures of the vinyl aromatic compound with at least one vinyl monomer copolymerizable therewith. As the vinyl monomer copolymerizable with the vinyl aromatic compound, there are mentioned vinyl cyanides such as acrylonitrile, methacrylonitrile and the like; acrylic esters such as methyl methacrylate, butyl acrylate and the like; acrylamide derivatives; etc. These are used alone or in combination of two or more.

In the rubber-reinforced styrene resin of this invention, the amount of the conjugated diene polymer composition used as a toughening agent is preferably 2 to 13% by weight, more preferably 5 to 10% by weight. When this amount is less than 2% by weight, the impact strength is low, and when it exceeds 13% by weight, only a resin having an inferior color tone and deteriorated mechanical characteristics such as rigidity and the like is obtained.

As to the rubber-reinforced styrene resin of this invention, the swelling index (SI) of the toluene-insoluble matter in the resin is preferably 8 to 13, particularly preferably 9 to 12. When the swelling index is less than 8, the Izod impact strength becomes low and at the same time the color tone is deteriorated, and when it exceeds 13, only a resin having a lowered dart impact strength is obtained.

The swelling index of the toluene-insoluble matter in the resin referred to herein is determined by the following method. That is, 1.0 g of a rubber-reinforced styrene resin is weighed and thereto is added 20 ml of toluene at room temperature, after which they are shaken for one hour, whereby the resin is dissolved in or swollen with toluene. The insoluble gel content is precipitated by centrifugation (for one hour under the conditions of 35,000 G) and recovered. Subsequently, the gel content is isolated by decantation of solution and weighed in the wet state. Thereafter, the gel content is dried at 160° C. at normal pressure for 45 minutes and then at a reduced pressure of 3 mmHg for 15 minutes and then weighed again. When the wet weight of the soft component is indicated as W and the dry weight is indicated as D, the swelling index (SI) is defined by the following equation:

$$SI=W/D$$

The rubber-reinforced styrene resin of this invention is variously molded by a processing method such as injection molding, extrusion molding or the like and can be used as practically useful articles. Moreover, in the processing, it may, if necessary, be mixed with various additives such as an antioxidant, ultraviolet absorber, flame retardant, lubricant, organic polysiloxane and the like and further with other thermoplastic resins such as polystyrene, methyl methacrylate-styrene copolymer resin and the like; thermoplastic elastomers such as styrene-butadiene block copolymer and its hydrogenation product; and the like, before use.

This invention is specifically explained below by Examples and Comparative Examples; however, these examples do not limit the scope of this invention.

The conjugated diene polymers used in the Examples of this invention and the Comparative Examples were produced as follows.

Production Example 1

1,3-Butadiene was continuously polymerized at 100° C. using butyllithium (0.06 parts by weight per 100 parts by weight of the monomer) in a hexane solvent and thereafter water was added to the resulting living polybutadiene solution in a proportion of 10 parts by weight per 100 parts by weight of the rubber, after which stearic acid was added in a proportion of 0.2 equivalents to the butyllithium. Subsequently, this solution was separated and thereto were added the given amounts of the antioxidants stated in the Examples and the Comparative Examples and thereafter the mixture was subjected to steam stripping to remove the solvent and then dehydrated by a hot roll. The Mooney viscosity of the polymer thus obtained was 52, the vinyl bond content in the polymer was 13 mole %. Moreover, the water content of the polymer was 0.3% by weight.

Production Example 2

1,3-Butadiene was continuously polymerized at 100° C. using butyllithium (0.13 parts by weight per 100 parts by weight of the monomer) in a hexane solvent, and thereafter, silicon tetrachloride was continuously added thereto in a proportion of 0.9 equivalents to the butyllithium to cause coupling. The polybutadiene solution obtained was treated in the same manner as in Production Example 1. The Mooney viscosity of the polymer thus obtained was 50 and the vinyl bond content in the polymer was 13 mole %. Moreover, the water content of the polymer was 0.4% by weight.

Production Example 3

1,3-Butadiene and styrene were continuously polymerized at 110° C. using 0.07 parts by weight of butyllithium per 100 parts by weight of the monomers in a hexane solvent and the living styrene-butadiene copolymer obtained was treated in the same manner as in Production Example 1. The Mooney viscosity of the polymer thus obtained was 45 and the bound styrene content in the polymer was 25.0% by weight, the block styrene content was 1.5% by weight, and the vinyl bond content in the butadiene portion was 13 mole %. Moreover, the water content of the polymer was 0.25% by weight.

Production Example 4

Two reactors were connected in series and 1,3-butadiene, hexane and butyllithium (0.10 parts by weight per 100 parts by weight of all the monomers) were continuously fed to the bottom of the first one thereof, after which polymerization was started at 110° C. The overflowing polymer solution, styrene and hexane were fed to the bottom of the second one and the polymerization was terminated at 110° C. The living styrene-butadiene copolymer solution obtained was treated in the same manner as in Production Example 1. The Mooney viscosity of the copolymer thus obtained was 80, the bound styrene content was 25.2%, the block styrene content was 23.9% and the vinyl bond content of the butadiene portion was 13 mole % Moreover, the water content of the polymer was 0.25 parts by weight.

The measurement of various characteristics was carried out by the following methods:

Money viscosity was measured using an L rotor at 2 rpm at 100° C.

Vinyl bond content was measured using an infrared spectrophotometer. In the calculation, the Morrero method was adopted for the polybutadiene and the Hampton method was adopted for the SB copolymer.

Water content was measured by a moisture meter according to the Karl Fischer method.

Bound styrene content was measured by an ultraviolet spectrophotometer.

Block styrene content was measured by an ultraviolet spectrophotometer after decomposing the polybutadiene moiety with a mixed solution of osmic acid and a peroxide and separating the block styrene through a glass filter.

The color tone of rubber was indicated by the b* value (b star) obtained by subjecting a rubber of 3×4×1 cm to measurement by a calorimetric color difference meter manufactured by Nippon Denshoku Kogyo. It is preferable that the numerical value is small. Incidentally, the term "base" means a color tone before the color tone stability test, and the term "dry discolorations" means a color tone after 60 minutes in an oven at 150° C. The term "wet discoloration" means a color tone after the lapse of 6 days under the conditions of a temperature of 60° C. and a humidity of 70%.

Dynamic stability is indicated by a gelation time required until the torque is elevated by 10% from the lowest torque when 65 g of a rubber was subjected to the conditions of 150° C.×80 rpm using a Laboplastomill, cam type mixer C-90 manufactured by Toyo Seiki Seisakusho. It is preferable that the time is long.

Static stability is indicated by the amount of gel obtained by heating 1 g of a rubber in an oven at 150° C. for 40 minutes, thereafter dissolving the same in 26 g of toluene, filtering the insoluble matter through a 100-mesh wire net and then drying the same. It is preferable that the numerical value is small.

Moreover, the following were used as antioxidants and the amounts of them blended are indicated by parts by weight (phr) of the antioxidant per 100 parts by weight of the rubber:

AO-1: 2,4-Bis(n-octylthiomethyl)-6-methylphenol
AO-2: n-Octadecyl 3-(3',5'-di-tert-butyl-4'-hydroxy-phenyl) propionate
AO-3: 2,6-Di-tert-butyl-4-methylphenol
AO-4: 2-tert-Butyl-6-(3'-tert-butyl-2'-hydroxy-5'-methylbenzyl)-4-methylphenyl acrylate
AO-5: Tris(nonylphenyl) phosphite

EXAMPLE 1 AND COMPARATIVE EXAMPLES 1 TO 6

Using the non-coupling conjugated diene polymer obtained in Production Example 1 (as to the amounts of antioxidants blended, see Table 1), a discoloration acceleration test in the dry state and the wet state, a dynamic stability test using Laboplastomill and a static stability test in an oven were carried out and evaluated. The results are shown in Table 1.

TABLE 1

|  |  |  | Example | Comparative Example | | | | | |
|---|---|---|---|---|---|---|---|---|---|
|  |  |  | 1 | 1 | 2 | 3 | 4 | 5 | 6 |
| Amount of antioxidant blended (phr) | AO-1 |  | 0.08 | 0.16 |  |  | 0.08 | 0.08 |  |
|  | AO-2 |  | 0.08 |  | 0.16 |  |  |  | 0.08 |
|  | AO-3 |  |  |  |  | 0.16 | 0.08 |  |  |
|  | AO-4 |  |  |  |  |  |  | 0.08 |  |
|  | AO-5 |  |  |  |  |  |  |  | 0.08 |
| Evaluation of stability | Color tone | Base | 0.3 | 1.2 | 0.7 | 1.2 | 1.2 | 1.0 | 0.5 |
|  |  | Dry discoloration | 1.6 | 1.8 | 2.2 | 6.4 | 5.1 | 3.5 | 1.9 |
|  |  | Wet discoloration | 1.5 | 1.7 | 1.2 | 3.2 | 3.2 | 2.5 | 1.5 |
|  | Dynamic stability (min) |  | 4.5 | 7.2 | 1.5 | 1.7 | 4.6 | 4.8 | 1.8 |
|  | Static stability (wt. %) |  | 0.3 | 3.4 | 0.6 | 1.2 | 0.7 | 0.5 | 2.8 |

From the above results, it is seen that the conjugated diene polymer composition of this invention in which a sulfur-containing phenol type antioxidant is combined with a specific phenol type antioxidant is good in color tone when these antioxidants are blended in small amounts and excellent in color tone stability and heat stability. On the other hand, in the Comparative Examples, the color tone is inferior or the gelation time in the dynamic stability test is short and the dynamic stability is inferior, or the amount of the gel produced in the static stability test is large, namely any of the test results is inferior.

EXAMPLES 2 TO 4 AND COMPARATIVE EXAMPLES 7 TO 11

The same evaluation as in Example 1 was conducted using the conjugated diene polymers shown in Production Examples 1 to 4 and the results are shown in Table 2.

TABLE 2

| | | | Example | | | Comparative Example | | | | |
|---|---|---|---|---|---|---|---|---|---|---|
| | | | 2 | 3 | 4 | 7 | 8 | 9 | 10 | 11 |
| | | | Kind of conjugated diene polymer | | | | | | | |
| | | | Non-coupling polymer (Production Ex. 1) | Rendom copolymer (Production Ex. 3) | Coupling polymer (Production Ex. 2) | Block copolymer (Production Ex. 4) | Non-coupling polymer (Production Ex. 1) | | Rendom copolymer (Production Ex. 3) |
| Amount of anti-oxidant blended (phr) | AO-1 | | 0.05 | 0.19 | 0.10 | 0.19 | 0.19 | 0.02 | 0.05 | 0.10 |
| | AO-2 | | 0.05 | 0.19 | 0.10 | 0.19 | 0.19 | 0.02 | 0.30 | |
| | AO-3 | | | | | | | | | 0.10 |
| Evaluation of stability | Color tone | Base | 0.3 | 0.1 | 0.3 | 0.4 | 0.4 | 0.5 | 1.2 | 0.8 |
| | | Dry discoloration | 2.3 | 1.5 | 1.2 | 2.5 | 2.1 | 10.5 | 3.2 | 3.8 |
| | | Wet discoloration | 1.5 | 1.4 | 0.9 | 2.4 | 2.0 | 1.9 | 3.5 | 2.5 |
| | Dynamic stability (min.) | | 2.7 | 9.5 | 6.5 | 9.7 | 8.5 | 1.3 | 3.0 | 6.5 |
| | Static stability (wt. %) | | 1.0 | 0.2 | 0.1 | 0.9 | 0.6 | 2.9 | 0.2 | 0.4 |

From the above results, it is seen that the conjugated diene polymer composition of this invention, in which a sulfur-containing phenol type antioxidant is combined with the specific phenol type antioxidant, is good in color tone and excellent in color tone stability and heat stability in the blending amount according to this invention. When the amount is less than the limited blending amount, the color tone stability and heat stability are inferior. Moreover, even when it exceeds the limited blending amount, the effect on heat stability is small and the color tone is deteriorated.

EXAMPLE 5

A rubber-reinforced styrene resin was obtained by a continuous bulk polymerization method using the noncoupling conjugated diene polymer composition obtained in Example 1 as a toughening agent.

The polymerization solution shown below was prepared and sent to a tower type reactor equipped with a stirrer and a jacket. The rate of stirring in the first reactor was adjusted to 100 rpm and the temperature was controlled so that the solids concentration at the outlet became 30%. The polymerization solution was sent successively to the second and third reactors, the temperature was controlled so that the solids concentration at the outlet of the final reactor became 80%, and polymerization was conducted with stirring.

| | | Total |
|---|---|---|
| Diene polymer composition (Example 1) | 4 wt. % | |
| Styrene | 86 wt. % | |
| Ethylbenzene | 10 wt. % | 100 parts by wt. |
| t-Dodecylmercaptan | | 0.02 part by wt. |
| 1,1-Bis(t-butylperoxy)-3,3,5-trimethylsiloxane | | 0.03 part by wt. |

Subsequently, unreacted styrene and ethylbenzene were removed at 230° C. in a vacuum in a devolatilization apparatus and thereafter pelletization was conducted to obtain a rubber-reinforced styrene resin. The content of the polymer composition in the resin was 5.0% by weight, and the swelling index (SI) of the toluene-insoluble matter was 10.4. The pellets were injection-molded and physical properties were determined. The results are shown in Table 3.

Evaluation of physical properties was carried out by the following methods:

Color tone was evaluated by a visual observation of a molded piece based on four grades. It was ranked using 1 (white)<2<3<4 (yellow). Accordingly, the smaller the numerical value the more preferable.

Izod impact strength was measured according to JIS:K-7110 (notched).

TABLE 3

| | | Example | | | | | Comparative Example | | | |
|---|---|---|---|---|---|---|---|---|---|---|
| | | 5 | 6 | 7 | 8 | 9 | 12 | 13 | 14 | 15 |
| Example of polymer composition used as toughening agent | | Example 1 | Example 1 | Example 1 | Example 3 | Example 4 | Comp. Example 4 | Comp. Example 10 | Comp. Example 7 | Comp. Example 8 |
| Content of polymer composition in resin (wt. %) | | 5.0 | 10.0 | 5.0 | 5.0 | 6.7 | 5.0 | 5.0 | 5.0 | 6.7 |
| Evaluation of physical properties | Color tone | 1 | 1 | 1 | 1 | 1 | 4 | 3 | 2 | 2 |
| | Izod impact strength (kg · cm/cm) | 6.5 | 12.5 | 7.2 | 6.7 | 6.8 | 6.3 | 6.6 | 4.5 | 2.8 |

EXAMPLE 6

A rubber-reinforced styrene resin was obtained in the same manner as in Example 5, except that the amount of the polymer composition was changed to 8% by weight and the amount of styrene was changed to 82% by weight. The content of the polymer composition in the resin was 10.0% by weight and the swelling index (SI) of the toluene-insoluble matter was 10.3. The results of measurement of physical properties are shown in Table 3.

EXAMPLE 7

A rubber-reinforced styrene resin was obtained in the same manner as in Example 5, except that the temperature of the devolatilization apparatus was set at 210° C. The content of the polymer composition in the resin was 5.0% by weight and the swelling index (SI) of the toluene-insoluble matter was 11.8. The results of measurement of physical properties are shown in Table 3.

EXAMPLE 8

A rubber-reinforced styrene resin was obtained in the same manner as in Example 5, except that the conjugated diene polymer composition obtained in Example 3 was used as a toughening agent. The content of the polymer composition in the resin was 5.0% by weight and the swelling index (SI) of the toluene-insoluble matter was 10.5. The results of measurement of physical properties are shown in Table 3.

EXAMPLE 9

A rubber-reinforced styrene resin was obtained in the same manner as in Example 5, except that the amount of the polymer composition was changed to 5.3% by weight, the amount of styrene was changed to 84.7% by weight and the random copolymer composition obtained in Example 4 was used as a toughening agent. The content of the polymer composition in the resin was 6.7% by weight and the swelling index (SI) of the toluene-insoluble matter was 10.5. The results of measurement of physical properties are shown in Table 3.

COMPARATIVE EXAMPLE 12

A rubber-reinforced styrene resin was obtained in the same manner as in Example 5, except that the conjugated diene polymer composition obtained in Comparative Example 4 was used as a toughening agent. The content of the polymer composition in the resin was 5.0% by weight and the swelling index (SI) of the toluene-insoluble matter was 10.2. The results of measurement of physical properties are shown in Table 3.

COMPARATIVE EXAMPLE 13

A rubber-reinforced styrene resin was obtained in the same manner as in Example 5, except that the conjugated diene polymer composition obtained in Comparative Example 10 was used as a toughening agent. The content of the polymer composition in the resin was 5.0% by weight and the swelling index (SI) of the toluene-insoluble matter was 10.4. The results of measurement of physical properties are shown in Table 3.

COMPARATIVE EXAMPLE 14

A rubber-reinforced styrene resin was obtained in the same manner as in Example 5, except that the coupling conjugated diene polymer composition obtained in Comparative Example 7 was used as a toughening agent. The content of the polymer composition in the resin was 5.0% by weight and the swelling index (SI) of the toluene-insoluble matter was 10.2. The results of measurement of physical properties are shown in Table 3.

COMPARATIVE EXAMPLE 15

A rubber-reinforced styrene resin was obtained in the same manner as in Example 5, except that the amount of the polymer composition was changed to 5.3% by weight, the amount of styrene was changed to 84.7% by weight and the SB block copolymer composition obtained in Comparative Example 8 was used as a toughening agent. The content of the polymer composition in the resin was 6.7% by weight and the swelling index (SI) of the toluene-insoluble matter was 10.6. The results of measurement of physical properties are shown in Table 3.

The rubber-reinforced styrene resins of the Examples are excellent in color tone and also have a high impact strength. On the other hand, the styrene resin in Comparative Examples 12 and 13 are inferior in color tone, through the use of a diene polymer composition containing an antioxidant of a kind other than in this invention or in a blending amount other than in this invention as a toughening agent. In addition, as in Comparative Examples 14 and 15, when a composition consisting of a diene polymer of a kind other than in this invention is used as a toughening agent, there is obtained a styrene resin remarkably inferior in not only color tone but also impact strength.

Industrial Applicability

The conjugated diene polymer composition of this invention is good in color tone and even when it is stored in a warehouse, the bottom of a ship at high temperatures or the like in a dry state or a high humidity state for a relatively long period of time, it is not discolored and has a very excellent heat stability as to dynamic stability and static stability. Moreover, when the above polymer composition is used as a toughening agent, a rubber-reinforced styrene resin excellent in color tone and impact strength can be obtained.

What is claimed is:

1. A conjugated diene polymer composition comprising:

(a) 100 parts by weight of a non-coupling conjugated diene polymer consisting of at least one conjugated diene or a non-coupling random copolymer consisting of a conjugated diene and at least one monovinyl aromatic compound, (b) 0.03 to 0.2 parts by weight of a sulfur-containing antioxidant represented by the following general formula (I):

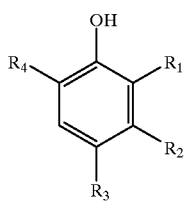

(I)

wherein $R_1$ and $R_3$ are —$CH_2$—S—$R_5$ in which each $R_5$ represents independently an alkyl group having 2 to 18 carbon atoms; $R_2$ represents hydrogen or a methyl group; and $R_4$ represents an alkyl group having 1 to 8 carbon atoms, and (c) 0.03 to 0.2 parts by weight of a phenol type antioxidant represented by the following general formula (II)

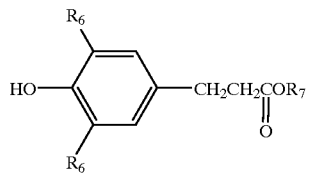

(II)

wherein $R_6$ represents a tert-butyl group; and $R_7$ represents an alkyl group having 2 to 22 carbon atoms.

2. The conjugated diene polymer composition according to claim 1, wherein the vinyl bond content in the component (a) is 10 to 25 mole %.

3. The conjugated diene polymer composition according to claim 1, which further contains 0.1 to 0.7 parts by weight of water.

4. A rubber-reinforced styrene resin in which the conjugated diene polymer composition according to claim 1 is contained as a toughening agent.

5. The rubber-reinforced styrene according to claim 4, wherein the content of the toughening agent is 2 to 13% by weight.

6. The rubber-reinforced styrene resin according to claim 4, wherein the swelling index of the toluene-insoluble matter in the resin is 8 to 13.

* * * * *